United States Patent Office 3,372,206
Patented Mar. 5, 1968

3,372,206
PROCESS FOR THE CYCLIZATION
OF BUTADIENE-1,3
Roy L. Pruett, Charleston, and William R. Myers, St. Albans, W. Va., assignors to Union Carbide Corporation, a corporation of New York
No Drawing. Filed Mar. 16, 1964, Ser. No. 352,359
9 Claims. (Cl. 260—666)

ABSTRACT OF THE DISCLOSURE

Process for producing the trimer of butadiene-1,3 which is prepared by inter-reacting butadiene-1,3 with a diaryl manganese compound. The trimer of butadiene-1,3 is useful in the manufacture of reagents.

---

This invention relates to production of cyclic ethylenically unsaturated compounds by inter-reaction of butadiene-1,3. More particularly, this invention relates to the manufacture of trans,trans,trans-cyclododecatriene-1,5,9 by inter-reaction of butadiene-1,3 in the presence of an aryl manganese compound.

It has been found that butadiene-1,3 can be reacted in the presence of an aryl manganese compound to produce, almost exclusively, trans,trans,trans-cyclododecatriene-1,5,9, a compound which has been gaining considerable interest as a research tool and for the manufacture of many useful reagents. The process of this invention achieves the production of this particular compound with the substantial exclusion of other, unwanted, by-products. Moreover, the process of this invention typically achieves the production of the desired product in yields exceeding 50 weight percent, basis weight butadiene-1,3 employed in the reaction, and preferably is obtained in yields exceeding 80 to 90 weight percent.

Illustrative aryl manganese compounds employable as the catalyst in the process of this invention are the diaryl manganese compounds, such as e.g., di-phenyl manganese, di-ortho-tolyl manganese, di-para-tolyl manganese, di-mesityl manganese, bis(2-methyl-4-ethylphenyl) manganese, bis(pentamethylphenyl) manganese, bis(2,4-di-tertiary-butylphenyl) manganese, phenyl-o-tolyl manganese, para-tolyl-phenyl manganese, phenylmesityl manganese, phenyl(2,4-di-tertiary-butylphenyl) manganese, and the like compounds. The diaryl manganese compounds include the monocyclic and polycyclic aryl substituted manganese compounds, the alkaryl manganese compounds where the alkyl moiety may be of from 1 to about 8 carbon atoms, the bicyclo-aryl substituted compounds, the arylalkaryl substituted manganese compounds where the alkylene moiety may contain from 1 to about 4 carbon atoms, and the like. Illustrative radicals which may be bonded to manganese to form the desired compounds include those specifically described above which particularly illustrate the monocyclic aryl and alkaryl radicals and such other radicals as naphthyl, 4-phenylmethylphenyl, 3-phenylethylphenyl, and the like radicals.

The diaryl manganese catalyst may be employed as such or as a complex with a coordinating complexing agent such as aliphatic ethers, e.g., dimethyl ether, diethyl ether, ethylene glycol dimethyl ether, ethylene glycol diethyl ether, propylene 1,2 or 1,3-glycol dimethyl or diethyl ether, diethylene glycol dimethyl ether, alicyclic ethers such as tetrahydrofuran, dioxane, tetrahydropyran, and the like, or olefins such as butadiene-1,3. Such complexes may be formed simply by mixing the diaryl manganese with the complexing agent. Such may be effected at ambient conditions, e.g., 25° C. at atmospheric pressure. Stability of the complex is enhanced by storing the complex at lower temperatures, e.g., at temperatures below about 20° C., preferably below about 10° C.—particularly in the case of the butadiene-1,3 complex which at the lower temperatures are stable mixtures of the diaryl manganese and butadiene-1,3 without formation of cyclotriene reaction product. In this embodiment, to wit, butadiene complexes, there may be employed from about 0.5 mole or less of butadiene up to about 20 moles, or more, of butadiene, for each mole of diaryl manganese employed. No solvent is necessary for effecting the inter-mixture and complexes but, however, if a solvent is desired, particularly with respect to the butadiene complex, such liquids as tetrahydrofuran, diethylene glycol dimethyl ether, diethylether, diethylene glycol dimethylether, and other highly oxygenated alkyl ethers may be incorporated in the catalyst mixture. Indeed, the ether complex may be mixed with butadiene-1,3 to form butadiene complex. Other solvents which are inert may be mixed with the catalyst complexes. For example, inert hydrocarbon solvents such as benzene, heptane, octane, hexane, cyclohexane, and the like, may be employed. It should be understood that the catalyst mixture, representing a complex of the ethers or butadiene-1,3 with the diaryl manganese compound, can be manufactured and stored in the absence of solvents.

The reaction conditions employed to produce trans,-trans,trans-cyclododecatriene-1,5,9 involve simple intermixing of butadiene-1,3 with diaryl manganese and/or the diaryl manganese complex. Intermixture may be performed at ambient conditions (25° C. and 1 atmosphere) and at higher or lower temperatures and pressures. In addition, extremely broad concentrations of either one of the components utilized in the reaction may be employed. However, it has been found desirable to utilize an amount of diaryl manganese compound or complex in the range of from about 0.0001 to about 20 weight percent of the charged butadiene-1,3, the weight of the diaryl manganese catalyst being based on the weight of manganese metal in the catalyst. Preferably, the diaryl manganese catalyst is employed in the range of from about 0.001 to about 20 percent by weight, most desirably at a range of from about 0.05 to 1 percent by weight (determined as Mn), basis the weight of the charged butadiene-1,3.

As indicated previously, the temperature at which the reaction proceeds is not narrowly critical but, however, it is noted that the reaction does operate somewhat slowly at room temperature and increases in reaction rates at somewhat higher temperatures. It is desirable to utilize a temperature range of from about 0° C. up to about 130° C., or higher, and preferably at a temperature range of from about 30° C. to about 90° C.

Solvents may or may not be utilized in the process. For example, the solvents described previously with respect to the formation of the diaryl manganese complex, such as the ethers and hydrocarbons, may be provided in the reaction resulting in the desired cyclic triene compounds. The solvent may be employed in a range of from about 1 weight percent, basis the weight of butadiene charged, up to about 10 times the weight of the butadiene-1,3 charged. Preferably, it is desirable to keep the amount of solvent employed in the reaction in the range of from about 10 to about 50 weight percent, basis weight of the butadiene-1,3 charged.

The reaction may be effected at autogenous pressures ranging from atmospheric pressure up to 100 atmospheres or more. Inert gases such as nitrogen, methane, argon, butane, and the like, may be added to provide an inert atmosphere over the reactants. However, under process operations involving the use of butadiene-1,3 at superatmospheric pressure and somewhat higher temperatures, the atmosphere is generally exclusively butadiene. Under such conditions, other inert gases are not usually needed.

Since the diaryl manganese compounds are readily affected by the presence of moisture, carbon oxides (e.g., carbon monoxide and carbon dioxide), and oxygen, it is desirable to effect the process in their absence. Thus, maintaining the reaction system anhydrous and under an inert atmosphere is desirable in the operation of this invention. By anhydrous, it is meant that the molar amount of water present in the reaction system does not exceed 50 mole percent of the diaryl manganese catalyst present in the reaction system.

The reaction can be effected over various time periods depending on the selected operative conditions of reaction. When employing a low temperature in the range of from about 0° C. up to 30° C., time periods of fifteen to twenty hours or more may be required for conversion of butadiene-1,3 to the desired cyclotriene. At higher temperatures, that is, 60° C. to 70° C., two to four hours are usually sufficient to achieve the conversion. The following examples serve to illustrate the foregoing.

*Example 1*

Phenyl magnesium bromide (0.06 mole) was prepared by adding 0.06 mole (9.4 grams) of bromobenzene to 0.06 mole (1.4 grams) of magnesium turnings in 200 milliliters of dry tetrahydrofuran.

In a separate flask, 0.03 mole of manganese (II) bromide was prepared by the addition of 0.03 mole (4.8 grams) of bromine to 0.06 mole (6.6 grams, 100% excess) of manganese powder suspended in 200 milliliters of dry tetrahydrofuran.

The solution of Grignard reagent was added to the manganese (II) bromide at −50° C. This gave a suspension of olive green solid. When warmed to room temperature, the color changed to lime green.

A 25 milliliters aliquot of this reaction slurry, containing 0.4 gram of diphenyl manganese present as the tetrahydrofuran complex, was charged into a heavy-walled glass tube. Then 18 grams of butadiene-1,3 was added.

The tube was sealed and heated at 60° C. overnight. It was then cooled and opened. The contents were removed and flash distilled at reduced pressure. The low-boiling fraction of 23 grams was found to contain 93 weight percent tetrahydrofuran, 2 weight percent unreacted butadiene, 2 weight percent 5-methylheptatriene-1,3,6 and 2 weight percent vinylcyclohexane. The higher-boiling fraction, which solidified on standing, was shown to be essentially pure trans,trans,trans-cyclododecatriene by an infrared spectrum. The yield was 10 grams (57 weight percent of theory). The non-distillable residue amounted to 5 grams.

*Example 2*

A solution of 0.03 mole of dimesityl manganese (II) tetrahydrofuranate in 400 milliliters of tetrahydrofuran was prepared according to the procedure of Example 1.

A heavy-walled glass tube was charged with 35 milliliters of the solution containing 0.78 gram of dimesityl manganese (II) and 25 grams of butadiene-1,3. The catalyst concentration was 3.1 weight percent of charged butadiene-1,3.

The tube was sealed and heated at 62° C. overnight. During this time, the volume decreased 14 percent—this is an indication of substantial conversion. After cooling, the tube was opened and the contents were flash distilled. The volatile fraction (30 grams) consisted of 16 weight percent unreacted butadiene, 83 weight percent tetrahydrofuran and 1 weight percent vinylcyclohexene. The remainder was a mixture of trans,trans,trans-cyclododecatriene and higher polymer.

*Example 3*

A heavy-walled glass tube was charged with 35 milliliters of the dimesityl manganese (II) tetrahydrofuranate slurry described in Example 2 and 25 grams of butadiene-1,3. After sealing the tube, the reaction was conducted at 115° C. overnight The volume concentration was 10 percent. Separation as described previously gave 12 grams unreacted butadiene-1,3 trans,trans,trans-cyclododecatriene and higher polymer.

What is claimed is:

1. A process comprising intermixing butadiene-1,3 with a catalytic amount of a diaryl manganese compound for a period of time sufficient to trimerize said butadiene-1,3.
2. A process for producing trans,trans,trans-cyclododecatriene-1,5,9 which comprises inter-reacting butadiene-1,3 with a catalytic amount of a diaryl manganese compound.
3. A process for making trans,trans,trans-cyclododecatriene-1,5,9 which comprises intermixing butadiene-1,3 with a catalytic amount of a diaryl manganese compound at a temperature at which said butadiene-1,3 inter-reacts to form said trans,trans,trans-cyclododecatriene-1,5,9.
4. The process of claim 3 wherein said diaryl manganese compound is in the form of a complex with a coordinating complexing agent.
5. The process of claim 4 wherein the diaryl manganese compound is an etherate complex.
6. The process of claim 4 wherein the diaryl manganese compound is a butadiene-1,3 complex.
7. The butadiene-1,3 complex of diaryl manganese.
8. The process of claim 3 wherein the diaryl manganese compound is provided in amounts of from about 0.0001 to about 20 weight percent of the butadiene-1,3, based on the weight of manganese in the compound.
9. The process of claim 3 wherein the intermixture is essentially anhydrous and in an essentially inert atmosphere.

References Cited

UNITED STATES PATENTS 3,122,567　2/1964　Zeiss et al. _____ 260—429
3,168,581　2/1965　Pruett _____ 260—666

DELBERT E. GANTZ, *Primary Examiner.*

V. O'KEEFE, *Assistant Examiner.*